United States Patent [19]

Allen

[11] 4,330,644

[45] May 18, 1982

[54] CURABLE TRIS(HYDROXYALKYL) AMINOMETHANE-MODIFIED EPOXY RESIN COMPOSITION

[75] Inventor: Roy A. Allen, Houston, Tex.

[73] Assignee: Shell Oil Company, Houston, Tex.

[21] Appl. No.: 250,980

[22] Filed: Apr. 3, 1981

[51] Int. Cl.$^3$ .................... C08G 59/28; C08G 59/64
[52] U.S. Cl. .................... 525/523; 525/525; 528/104; 528/111; 528/89; 528/93
[58] Field of Search ............... 525/523, 525; 528/104, 528/111, 89, 93

[56] References Cited

U.S. PATENT DOCUMENTS

| | | | |
|---|---|---|---|
| 2,633,458 | 3/1953 | Shokal | 260/45.2 |
| 3,336,241 | 8/1967 | Shokal | 260/2 |
| 3,477,981 | 11/1969 | DeHoff et al. | 260/31.2 |
| 3,477,990 | 11/1969 | Dante et al. | 260/47 |
| 3,547,881 | 12/1970 | Mueller et al. | 260/47 |
| 3,607,833 | 9/1971 | DeHoff et al. | 260/47 |
| 3,756,984 | 9/1973 | Klaren et al. | 260/47 EC |
| 3,978,027 | 8/1976 | Marshall | 260/47 EP |

*Primary Examiner*—Earl A. Nielsen
*Attorney, Agent, or Firm*—Norris E. Faringer

[57] ABSTRACT

The present invention is directed to a curable composition comprising (1) a solid epoxy composition prepared by reacting (a) a solid epoxy resin prepared by reacting a normally liquid epoxy resin with a polyhydric phenol in the presence of an etherification catalyst with (b) a small amount of tris(hydroxymethyl) aminomethane and (2) at least one epoxy curing agent.

9 Claims, No Drawings

CURABLE TRIS(HYDROXYALKYL) AMINOMETHANE-MODIFIED EPOXY RESIN COMPOSITION

BACKGROUND OF THE INVENTION

The preparation of glycidyl polyethers of polyhydric phenols, particularly dihydric phenols is well-known. For example, such glycidyl polyethers of dihydric phenols may be prepared by reacting the required proportions of the dihydric phenol and epichlorohydrin in an alkaline medium. The desired alkalinity is obtained by adding basic substances, such as sodium or potassium hydroxide, preferably in stoichiometric excess to the epichlorohydrin. The reaction is preferably accomplished at temperatures within the range of from 50° C. to 150° C. The heating is continued for several hours to effect the reaction and the product is then washed free of salt and base.

By adjusting the relative amounts of the reactants and the process conditions, the resulting glycidyl polyethers will range from liquids to solid epoxy resins. See, for example, U.S. Pat. No. 2,633,458, wherein the preparation of various glycidyl polyethers of dihydric phenols is described. Polyether A is a liquid, whereas Polyether E is a solid epoxy resin. This technique for the preparation of solid epoxy resin requires constant process and control changes to accommodate the great variety of molecular weight ranges demanded by the various users of epoxy resins. Accordingly, there is a growing trend to utilize a so-called "fusion" technique wherein a liquid polyether similar to Polyether A of U.S. Pat. No. 2,633,458 is prepared. Then, using this liquid epoxy resin as a base resin, solid resins having a wide range of molecular weights may be subsequently prepared by reacting said liquid resin with an appropriate amount of a dihydric phenol in the presence of an etherification catalyst. This fusion process is described in U.S. Pat. No. 3,477,990, U.S. Pat. No. 3,547,881, and U.S. Pat. No. 3,978,027. In some respects; however, solid epoxy resins prepared by this fusion technique do not exhibit the same physical properties as the solid resins prepared by the process described in U.S. Pat. No. 2,633,458, especially in pipe coatings.

The use of tris(hydroxymethyl) aminomethane to inhibit the crystallization of liquid diglycidyl ethers of Bisphenol A is known. See, for example, U.S. Pat. No. 3,477,981. Prepolymers of tris(hydroxymethyl) aminomethane and liquid epoxy resins are also known. See, for example, U.S. Pat. No. 3,607,833. These prepolymers contain a relatively large amount of tris(hydroxymethyl) aminomethane, e.g., from about 5 to 14%.

It has now been found that the physical properties of cured solid epoxy resins prepared via the fusion technique can be significantly improved by reacting the solid fusion epoxy resin with a small amount of tris(hydroxyalkyl) aminomethane, generally less than 1%.

SUMMARY OF THE INVENTION

The present invention is directed to a curable composition comprising (1) a solid epoxy composition prepared by reacting (a) a solid epoxy resin prepared by reacting a normally liquid epoxy resin with a polyhydric phenol in the presence of an etherification catalyst with (b) a small amount of tris(hydroxymethyl) aminomethane and (2) at least one epoxy curing agent.

DESCRIPTION OF THE PREFERRED EMBODIMENT

The present invention is particularly directed to a curable composition especially suitable for pipe coatings comprising (1) a solid epoxy composition prepared by reacting (a) a solid epoxy resin prepared by reacting a normally liquid epoxy resin containing more than one vicinal epoxy group in the molecule with a polyhydric phenol, preferably Bisphenol A, in the presence of an etherification catalyst (e.g., "onium" salt) with (b) less than 1% by weight based on the solid epoxy resin of tris(hydroxymethyl) aminomethane and (2) at least one epoxy curing agent, preferably an amino compound.

As stated hereinbefore, the preparation of solid epoxy resins via the fusion process is well known. Accordingly, such resins prepared by processes described in U.S. Pat. No. 3,477,990, U.S. Pat. No. 3,547,881 and U.S. Pat. No. 3,978,027, among others, are suitable for use in the present invention.

Simply, a normally liquid epoxide is reacted with a dihydric phenol in the presence of a suitable catalyst, usually an onium salt.

THE POLYEPOXIDES

Although normally liquid epoxides are suitable in the present compositions, semi-solid epoxy resins as well as mixtures of liquid resins containing a small amount of solid resin are useful.

The liquid polyepoxides employed in the present invention include those compounds possessing more than one vic-epoxy group per molecule, i.e., more than one

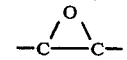

group per molecule. These polyepoxides are saturated or unsaturated, aliphatic, cycloaliphatic, aromatic or heterocyclic, and are substituted, if desired, with non-interfering substituents, such as halogen atoms, hydroxy groups, ether radicals, and the like. Polyepoxides employed are monomeric or polymeric. Preferred liquid polyepoxides include the so-called liquid glycidyl polyethers of polyhydric phenols and polyhydric alcohols. More preferred are the glycidyl polyethers of 2,2-bis(4-hydroxyphenyl)propane having an average molecular weight between about 300 and about 900 and a epoxide equivalent weight of between about 140 and about 500. Especially preferred are the glycidyl polyethers of 2,2-bis(4-hydroxyphenyl)propane having an average molecular weight of between about 300 and about 900, an epoxide equivalent weight of between about 140 and about 500, and containing from about 0.1% to about 1.0% weight or higher saponifiable chlorine. As used herein the terms "epoxide equivalent weight" and "weight per epoxide" refer to the average molecular weight of the polyepoxide molecule divided by the average number of oxirane groups present in the molecule.

Various examples of polyepoxides that may be used in this invention are given in U.S. Pat. No. 3,477,990 (e.g., column 2, line 39 to column 4, line 75) and it is to be understood that so much of the disclosure of that patent relative to examples of polyepoxides is incorporated by reference into this specification.

Other suitable epoxy resins include those compounds derived from polyhydric phenols and having at least one vicinal epoxy group wherein the carbon-to-carbon bonds within the six-membered ring are saturated. Such epoxy resins may be obtained by at least two well-known techniques, i.e., by (1) the hydrogenation of glycidyl polyethers of polyhydric phenols or (2) by the reaction of hydrogenated polyhydric phenols with epichlorohydrin in the presence of a suitable catalyst such as Lewis acids. See, for example, U.S. Pat. No. 3,336,241.

ETHERIFICATION CATALYSTS

In general, any catalyst which will catalyze the epoxy-phenoxy reaction is suitable for use in preparing the fusion resin. Preferred catalyst, however, are the so-called "onium" salts, especially the phosphonium and ammonium halides. Suitable phosphonium halides are disclosed in U.S. Pat. No. 3,477,990, and it is understood that so much of the disclosure relative to phosphonium halides is incorporated by reference in this specification.

The amount of etherification catalyst will vary from about 0.001% to about 10% by weight of the polyepoxide and will preferably range from about 0.05% to about 5% by weight. Of course, mixtures of catalysts may be employed.

PHENOLS

Suitable phenols include those compounds possessing at least one hydroxyl group attached to an aromatic nucleus. The phenols are monohydric or polyhydric and are substituted, if desired, with a great variety of different types of substituents. Examples of the phenols include among others, phenol, resorcinol, o-cresol, m-cresol, p-cresol, chlorophenol, nitrophenol, hydroquinone, 2,2-bis(4-hydroxyphenyl)propane, 2,2-bis(4-hydroxyphenyl)-pentane, and the like, and polymeric type polyhydric phenols obtained by condensing monohydric or polyhydric phenols with formaldehyde.

Preferred phenols to be used are the polyhydric phenols containing from 2 to 6 OH groups and up to 30 carbon atoms. Coming under special consideration are the phenols of the formula

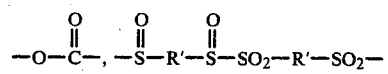

wherein X is a polyvalent element or radical and R independently is a member of the group consisting of hydrogen, halogen and hydrocarbon radicals. The preferred elements or radicals represented by X are oxygen, sulfur, —SO—, —SO$_2$—, divalent hydrocarbon radicals containing up to 10 carbon atoms and oxygen, silicon, sulfur or nitrogen containing hydrocarbon radicals, such as

—OR'O—, —OR'OR'O—, —S—R'—S—,

—S—R'—S—R'—S, —OSiO—, —OSiOSiO—,

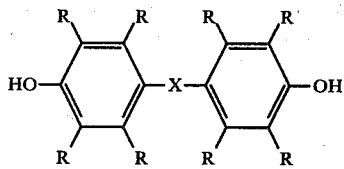

-continued

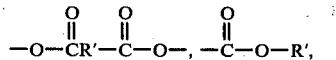

radicals wherein R' is a divalent hydrocarbon radical.

Various examples of phenols that may be used in this invention are also given in U.S. Pat. No. 3,477,990 (e.g., column 5, line 1 to column 6, line 10) and it is to be understood that so much of the disclosure of that patent relative to examples of phenols is incorporated by reference into this specification.

The amount of the epoxide and the phenol to be employed in preparing the fusion resin varies over a wide range depending upon the type of reactants and the type of product to be produced. In general, these reactants are used in approximately chemical equivalent amounts, i.e., a chemical equivalent amount of the phenol will be that sufficient to furnish one phenolic hydroxyl for every epoxy group to be reacted. For example, if one is reacting a diepoxide with a monohydric phenol and both epoxy groups are to be reacted, one mole of diepoxide should be reacted with about two moles of the monohydric phenol. On the other hand, if one is reacting a diepoxide with a dihydric phenol and a monomer product is desired by reacting both epoxide groups, one should react one mole of the diepoxide with about 2 moles of the polyhydric phenol. If a polymeric product is desired smaller ratios should be utilized as desired, such as, for example, 4 moles of the diepoxide and 5 moles of the polyhydric phenols.

Superior results are obtained when the higher molecular weight resins are produced and in this case the ratios of reactants are varied depending upon the molecular weight desired and upon the type of end groups, i.e., whether the product is to be terminated with an epoxide or with a phenol.

An especially preferred phenolic hydroxy ether resin having an epoxide equivalent weight of between about 2000 and about 4000 obtained by reacting 2,2-bis(4-hydroxyphenyl)propane with the diglycidyl ether of 2,2-bis(4-hydroxyphenyl)propane having an epoxide equivalent weight between about 140 and about 500.

The reaction is conducted in the presence or absence of solvents or diluents. In most cases, the reactants are liquid and the reaction is easily effected without the addition of solvents or diluents. However, in some cases, where either or both reactants are solids or viscous liquids it is desirable to add diluents to assist in effecting the reaction. Examples of such materials include the inert liquids, such as inert hydrocarbons as xylene, toluene, cyclohexane and the like.

If solvents are employed in the reaction and the resulting product is to be used for coating purposes, the solvent is typically retained in the reaction mixture. Otherwise, the solvent is removed by any suitable method such as by distillation or the like.

When it is desired to produce phenolic hydroxy ethers of higher viscosities but not higher epoxide equivalent weights, the polyepoxide and phenol are subjected to thermal bodying prior to the addition of the catalyst. "Thermal bodying" refers to heating the polyepoxidephenol mixture at specified temperatures and times prior to adding the catalyst. A preferred thermal bodying treatment comprises heating the polyepoxide mixture to a temperature of between about 120° C. and 200° C., preferably between about 145° C. and about 165° C., for between about 15 minutes and 60 minutes.

The solid fusion epoxy resin obtained by the above process are the desired phenolic hydroxy ether compounds. Their physical characteristics depend upon the desired reactants and proportions. In general, the products vary from liquids to solids, and in the case of the high molecular weight resins vary from viscous liquids to hard solids. The products possess at least one alcoholic hydroxyl group formed by each reaction of the epoxide and phenolic hydroxyl group, and can be further reacted through this group or groups. The polyfunctional reactants also give products terminated in phenolic hydroxyl groups and/or epoxy groups, and these are available for further reaction with the tris(hydroxymethyl) aminomethane to produce curable coatings exhibiting excellent physical properties, especially improved adhesion and hot-water resistance.

The tris(hydroxyalkyl)aminomethane may be advantageously added to the fusion resin at the end or near the end of the fusion reaction. The preferred tris(hydroxyalkyl)aminomethanes are tris(hydroxymethyl)aminomethane and tris(hydroxyethyl)aminomethane.

The tris(hydroxyalkyl) aminomethane is employed in amounts from about 0.01 to about 1 parts per 100 parts by weight (phr) of the fusion epoxy resin.

The resulting tris-aminomethane modified solid epoxy fusion resin may be cured with conventional epoxy curing agents to produce cured compositions having improved physical properties. For example, when these modified fusion resins are formulated into typical thick-film epoxy powder coatings of the type used in coating pipe for underground service, the resins demonstrate an unexpected improvement under the stress of cathodic protection and also after exposure to hot water.

The modified solid fusion epoxy resins obtained by use of the present invention are reacted with various conventional curing agents to form hard insoluble, infusible products. Examples of suitable curing agents include, among others, the poly-basic acids and their anhydrides such as the di, tri- and higher carboxylic acids; those acids containing sulfur, nitrogen, phosphorus or halogens; amino-containing compounds such as, for example, diethylene triamine and pyridine; polyamides containing active amino and/or carboxyl groups; and others.

Suitable such curing agents are disclosed in U.S. Pat. No. 3,477,990.

The amount of curing agent varies considerably depending upon the particular agent employed. For the alkalies or phenoxides, 1% to 4% by weight is generally suitable. With phosphoric acid and esters thereof, good results are obtained with 1 to 10% by weight added. The tertiary amine compounds are preferably used in amounts of about 1% to 15% by weight. The acids, anhydrides, polyamides, polyamines, polymercaptans, etc. are preferably used in at least 0.8 equivalent amounts, and preferably 0.8 to 1.5 equivalent amounts. An equivalent amount refers to that amount needed to give one active hydride (or anhydride group) per epoxy group.

Preferred curing agents include amino-containing compounds especially the imidazoles and benzimidazoles as well as substituted imidazoles and benzimidazoles. Very preferred curing agents include the epoxy adducts of imidazole and substituted imidazole compounds as disclosed in U.S. Pat. No. 3,756,984. It is sometimes desirable to use a mixture of amino-containing compounds such as an adduct of an imidazole compound and an epoxy resin in combination with dicyandiamide.

Solvents or diluents are sometimes added to make the composition more fluid or sprayable. Preferred solvents or diluents include those which are volatile and escape from the polyepoxide composition before or during cure such as ester, chlorinated hydrocarbons and the like. To minimize expense, these active solvents are often used in admixture with aromatic hydrocarbons such as benzene, toluene, xylene, etc. and/or alcohols such as ethyl, isopropyl or n-butyl alcohol. Solvents which remain in the cured compositions are used, such as diethyl phthalate, dibutyl phthalate and the like, as well as cyano-substituted hydrocarbons, such as acetonitrile, propionitrile, adiponitrile, benzonitrile, and the like. It is also convenient to employ normally liquid glycidyl compounds, glycidyl cyclopentyl ether, diglycidyl ether, glycidyl ether of glycerol and the like, and mixtures thereof.

Other materials are also added to the composition as desired. This includes other types of polyepoxides such as described in U.S. Pat. No. 3,477,990. This also includes fillers, such as sand, rock, resin particles, graphite, asbestos, glass or metal oxide fibers, and the like, plasticizers, stabilizers, asphalts, tars, resins, insecticides, fungicides, anti-oxidants, pigments, stains and the like.

The temperature employed in the cure varies depending chiefly on the type of curing agent. The amino-containing curing agents generally cure at or near temperature and no heat need be applied. The acids, anhydrides, and melamine derivatives, on the other hand, generally require heat, such as temperatures ranging from about 65° C. to about 210° C. Preferred temperatures range from about 90° C. to about 210° C. and more preferably from about 120° C. to 195° C.

To illustrate the manner in which the invention may be carried out, the following examples are given. It is to be understood, however, that the examples are for the purposes of illustration and the invention is not to be regarded as limited to any of the specific materials or conditions recited therein. Unless otherwise indicated, parts are parts by weight.

Polyepoxide A is a glycidyl polyether of 2,2-bis(4-hydroxyphenyl) propane having an average molecular weight of about 350 and a weight per epoxide (WPE) of about 180.

Epoxy Curing Agent X is a 50:50 weight blend of dicyandiamide and an adduct of Polyepoxide A and 2-methyl imidazole.

EXAMPLE I

This example illustrates the preparation of the present curable epoxy composition.

2468 grams of Polyepoxide A was added to 1014 grams of Bisphenol A and the mass heated to 230° F. under nitrogen cover. At this temperature, 1.1 grams of a 50% aqueous solution of tetramethyl ammonium chloride was added. An exotherm resulted and the temperature was held at 335° F. for one hour at which time 18.4 grams (0.53% of total charge) of tris(hydroxymethyl) aminomethane was added, and processing continued at 335° F. for 30 minutes. The resulting composition was then poured out to cool. The product was a light colored clear solid resin with a WPE of 902. A 40% solution of this resin in 2-(2-n-butoxyethoxy)ethanol, (butyl DIOXITOL ® Glycol Ether), had a Gardner-Holdt viscosity of "U".

EXAMPLE II

The same procedure as used in Example I was employed except that the level of tris(hydroxymethyl)aminomethane was increased to 0.70%. The product from this reaction had a WPE of 891 and a Gardner-Holdt viscosity of "U" at 40% non-volatile in butyl DIOXITOL ® Glycol Ether.

EXAMPLE III

Each of the resins from Examples I and II, as well as an unmodified control resin, were melt-mixed in a BUSS Model K-46 extruder (barrel temperature, 60° C.) in the formulation shown below:

| | |
|---|---|
| Epoxy Resin | 1239 |
| Epoxy Curing Agent X | 47 |
| Barium Sulphate (Barytes #1, Pfizer Co.) | 175 |
| Red Iron Oxide, R-2899 (Pfizer Co.) | 23 |
| Cabosil M5 (Cabot Corp.) | 7 |
| Modaflow Powder II (Monsanto Chemical Co.) | 7 |
| | 1498 |

The compositions based on the above formulation were thoroughly dry-blended and extruded. The extrudates were coarse ground and passed through a micorpulverizer to give a free-flowing powder, suitable for fluidized bed application. Grit blasted, cold rolled steel panels were dip coated (12 mil. film) in a fluidized bed with each of the powders. The panels were preheated to 475° F., dip coated, post-cured 90 seconds at 475° F. and water-quenched. The following tests were run on powder coatings made from the two modified resins and the control.

1. Gel time on the uncured powder on a 400° cure plate, in seconds.
2. Pencil Hardness: Reported as the softest pencil that will actually cut the surface of the film.
3. MIBK Resistance: Time of exposure to MIBK required for the hardness of the film to drop two graduations on the pencil harness scale.
4. Flexibility at 0° F.: A heavy gauge (1"×8"×3/8") cold rolled steel bar, with a 12 mil. coating of the material is cooled to 0° F. and bent around a 7½" diameter mandrel over a 30 second time period.
5. Cathodic Disbonding Test: A 1/8" diameter hole is drilled in the coating just down to the metal surface. The coating is then subjected to immersion in 3% NaCl at 77° F., with an impressed voltage of six volts negative for 30 days. The amount of undercutting (disbonding) at the hole is determined by wedging a small penknife blade under the coating, and this is reported as the increase in radius from the center of the hole in 1/64-ths of an inch.
6. Hot Water Adhesion: A flat probe is immersed in boiling distilled water for 15 days. The panel is quickly removed from the water and a 90° "V" cut is made in the coating. With the aid of a penknife an attempt is made to peel off the coating, while still hot, starting at the point of the "V". Adhesion is judged by the ease or difficulty with which the coating is removed.

TABLE I

| | Compositions | | |
|---|---|---|---|
| | A | B | C |
| % tris(hydroxymethyl) aminomethane | 0.53 | 0.70 | None |
| Gel Time at 400° F., seconds | 12 | 12 | 17 |
| Pencil Hardness | F | F | F |
| MIBK Resistance, minutes | >5<10 | >10<15 | >30 |
| Cathodic Disbonding (radius of disbonded area) 30 days @ 77° F. | 11/64 | 13/64 | 22/64 |
| Hot water adhesion | Good | Good | Poor |

Observation: The modified resins demonstrate faster gel times and better disbonding resistance as shown by the lower radii for disbonded area. A definite improvement in hot water adhesion was also observed for the coatings made with the modified resins.

What is claimed is:

1. A curable composition comprising (1) a solid epoxy composition prepared by reacting (a) a solid epoxy resin prepared by reacting a normally liquid epoxy resin containing at least one vicinal epoxy group in the molecule with a polyhydric phenol in the presence of an etherification catalyst with (b) from about 0.01% to about 1.0% by weight based on the solid epoxy resin of a tris(hydroxyalkyl)aminomethane and (2) at least one epoxy curing agent.

2. The composition of claim 1 wherein the liquid epoxy resin is a glycidyl polyether of 2,2-bis(4-hydroxyphenyl)propane.

3. The composition of claim 1 wherein the polyhydric phenol is 2-2-bis(4-hydroxyphenyl)propane.

4. The composition of claim 1 wherein the etherification catalyst is an onium compound.

5. The composition of claim 1 wherein the tris(hydroxyalkyl)aminomethane is tris(hydroxymethyl)aminomethane.

6. The composition of claim 1 wherein at least one epoxy curing agent is an amino-containing compound.

7. The composition of claim 6 wherein the amino-containing compound is an adduct of a polyepoxide and an imidazole compound.

8. The composition of claim 7 wherein the adduct is an adduct of a glycidyl polyether of 2,2-bis(4-hydroxyphenyl)propane and 2-methyl imidazole.

9. The composition of claim 7 wherein dicyandiamide is additionally employed.

* * * * *